US006737809B2

(12) United States Patent
Espiau et al.

(10) Patent No.: US 6,737,809 B2
(45) Date of Patent: May 18, 2004

(54) PLASMA LAMP WITH DIELECTRIC WAVEGUIDE (75) Inventors: Frederick M. Espiau, Topanga, CA (US); Chandrashekhar J. Joshi, Santa Monica, CA (US); Yian Chang, Los Angeles, CA (US)

(73) Assignee: Luxim Corporation, Venice, CA (US)

( * ) Notice: Subject to any disclaimer, the term of this patent is extended or adjusted under 35 U.S.C. 154(b) by 0 days.

(21) Appl. No.: 09/809,718

(22) Filed: Mar. 15, 2001

(65) Prior Publication Data
US 2002/0011802 A1 Jan. 31, 2002

Related U.S. Application Data
(60) Provisional application No. 60/222,028, filed on Jul. 31, 2000.

(51) Int. Cl.[7] ............................................. H05B 37/00
(52) U.S. Cl. .................... 315/39; 315/248; 313/634; 313/636
(58) Field of Search .................. 315/39, 248; 313/634, 313/636

(56) References Cited

U.S. PATENT DOCUMENTS

| 3,641,389 | A | 2/1972 | Leidigh ........................ 315/39 |
| 3,787,705 | A | 1/1974 | Bolin et al. .................. 315/248 |
| 3,826,950 | A | 7/1974 | Hruda et al. ................. 315/267 |
| 3,860,854 | A | 1/1975 | Hollister ..................... 315/248 |
| 3,942,058 | A | 3/1976 | Haugsjaa et al. .............. 313/44 |
| 3,943,401 | A | 3/1976 | Haugsjaa et al. ............. 315/39 |
| 3,993,927 | A | 11/1976 | Haugsjaa et al. ............. 315/39 |
| 4,001,631 | A | 1/1977 | McNeill et al. ............... 315/39 |
| 4,041,352 | A | 8/1977 | McNeill et al. .............. 315/248 |
| 4,053,814 | A | 10/1977 | Regan et al. ................ 315/248 |
| 4,359,668 | A | 11/1982 | Ury ............................ 315/39 |
| 4,485,332 | A | 11/1984 | Ury et al. .................... 315/112 |
| 4,504,768 | A | 3/1985 | Ury et al. .................... 315/248 |
| 4,507,587 | A | 3/1985 | Wood et al. ................... 315/39 |
| 4,507,597 | A | 3/1985 | Trost .......................... 318/653 |
| 4,633,140 | A | 12/1986 | Lynch et al. ................. 315/248 |
| 4,652,790 | A | 3/1987 | Wood .......................... 313/112 |
| 4,673,846 | A | 6/1987 | Yoshizawa et al. ........... 315/248 |
| 4,749,915 | A | 6/1988 | Lynch et al. ................. 315/248 |
| 4,887,192 | A | 12/1989 | Simpson et al. .............. 362/265 |
| 4,902,935 | A | 2/1990 | Wood .......................... 315/112 |
| 4,954,755 | A | 9/1990 | Lynch et al. ................. 315/248 |
| 4,975,625 | A | 12/1990 | Lynch et al. ................. 315/344 |
| 4,978,891 | A | 12/1990 | Ury ............................ 315/117 |
| 5,021,704 | A | 6/1991 | Walker et al. ................ 313/35 |
| 5,051,663 | A | 9/1991 | Ury et al. .................... 315/248 |
| 5,086,258 | A | * | 2/1992 | Mucklejohn et al. ......... 315/248 |
| 5,227,698 | A | 7/1993 | Simpson et al. .............. 315/248 |
| 5,334,913 | A | 8/1994 | Ury et al. .................... 315/248 |
| 5,361,274 | A | 11/1994 | Simpson et al. ............... 372/72 |
| 5,404,076 | A | 4/1995 | Dolan et al. ................. 313/572 |
| 5,438,242 | A | 8/1995 | Simpson ...................... 315/219 |
| 5,448,135 | A | 9/1995 | Simpson ....................... 315/39 |
| 5,525,865 | A | 6/1996 | Simpson ....................... 315/39 |
| 5,541,475 | A | 7/1996 | Wood et al. .................. 313/484 |
| 5,594,303 | A | 1/1997 | Simpson et al. ............... 315/39 |
| 5,786,667 | A | 7/1998 | Simpson et al. ............... 315/39 |

(List continued on next page.)

FOREIGN PATENT DOCUMENTS

| DE | 195 32 780 A1 | 3/1997 |
| EP | 0 035 898 A1 | 9/1981 |

Primary Examiner—David Vu
(74) Attorney, Agent, or Firm—Edward Gray (57) ABSTRACT A dielectric waveguide integrated plasma lamp (DWIPL) with a body consisting essentially of at least one dielectric material having a dielectric constant greater than approximately 2, and having a shape and dimensions such that the body resonates in at least one resonant mode when microwave energy of an appropriate frequency is coupled into the body. A bulb positioned in a cavity within the body contains a gas-fill which when receiving energy from the resonating body forms a light-emitting plasma.

35 Claims, 7 Drawing Sheets

U.S. PATENT DOCUMENTS

| | | | |
|---|---|---|---|
| 5,831,386 A | 11/1998 | Turner et al. | 315/570 |
| 5,841,242 A | 11/1998 | Simpson et al. | 315/248 |
| 5,866,980 A | 2/1999 | Dolan et al. | 313/570 |
| 5,910,710 A | 6/1999 | Simpson | 315/248 |
| 5,923,116 A | 7/1999 | Mercer et al. | 313/113 |
| 5,949,180 A | 9/1999 | Walker | 313/113 |
| 6,005,332 A | 12/1999 | Mercer | 313/113 |
| 6,031,333 A | 2/2000 | Simpson | 315/39 |
| 6,084,348 A | 7/2000 | Love | 313/567 |
| 2001/0035720 A1 * | 11/2001 | Guthrie et al. | 315/39 |

* cited by examiner

PLASMA LAMP WITH DIELECTRIC WAVEGUIDE

This application claims priority-to a U.S. Provisional Application entitled "Plasma Lamp," having Ser. No. 60/222,028 and filed on Jul. 31, 2000, which is hereby incorporated by reference as though fully set forth herein.

BACKGROUND OF THE INVENTION

1. Field of the Invention

The field of the present invention relates to devices and methods for generating light, and more particularly to electrodeless plasma lamps.

2. Background

Electrodeless plasma lamps provide point-like, bright, white light sources. Because they do not use electrodes, electrodeless plasma lamps often have longer useful lifetimes than other lamps. Electrodeless plasma lamps in the prior art have certain common features. For example in U.S. Pat. Nos. 4,954,755 to Lynch et al., 4,975,625 to Lynch et al., 4,978,891 to Ury et al., 5,021,704 to Walter et al., 5,448,135 to Simpson, 5,594,303 to Simpson, 5,841,242 to Simpson et al., 5,910,710 to Simpson, and 6,031,333 to Simpson, each of which is incorporated herein by reference, the plasma lamps direct microwave energy into an air cavity, with the air cavity enclosing a bulb containing a mixture of substances that can ignite, form a plasma, and emit light.

The plasma lamps described in these patents are intended to provide brighter light sources with longer life and more stable spectrum than electrode lamps. However, for many applications, light sources that are brighter, smaller, less expensive, more reliable, and have long useful lifetimes are desired, but such light sources until now have been unavailable. Such applications include, for example, streetlights and emergency response vehicles. A need exists, therefore, for a very bright, durable light source at low cost.

In the prior art, the air-filled cavity of the electrodeless plasma lamp is typically constructed in part by a metal mesh. Metal mesh is used because it contains the microwave energy within the cavity while at the same time permitting the maximum amount of visible light to escape. The microwave energy is typically generated by a magnetron or solid state electronics and is guided into the cavity through one or more waveguides. Once in the air-filled cavity, microwave energy of select frequencies resonates, where the actual frequencies that resonate depend upon the shape and size of the cavity. Although there is tolerance in the frequencies that may be used to power the lamps, in practice, the power sources are limited to microwave frequencies in the range of 1–10 GHz.

Because of the need to establish a resonance condition in the air-filled cavity, the cavity generally may not be smaller than one-half the wavelength of the microwave energy used to power the lamp. The air-filled cavity and thereby, the plasma lamp itself has a lower limit on its size. However, for many applications, such as for high-resolution monitors, bright lamps, and projection TVs, these sizes remain prohibitively large. A need exists therefore for a plasma lamp that is not constrained to the minimum cavity sizes illustrated by the prior art.

In the prior art, the bulbs are typically positioned at a point in the cavity where the electric field created by the microwave energy is at a maximum, the support structure for the bulb is preferably of a size and composition that does not interfere with the resonating microwaves, as any interference with the microwave& reduces the efficiency of the lamp. The bulbs, therefore, are typically made from quartz. Quartz bulbs, however, are prone to failure because the plasma temperature can be several thousand degrees centigrade, which can bring the quartz wall temperature to near 1000° C. Furthermore, quartz bulbs are unstable in terms of mechanical stability and optical and electrical properties over long periods. A need exists, therefore, for a light source that overcomes the above-described issues, but that is also stable in its spectral characteristics over long periods.

In prior art plasma lamps, the bulb typically contains a noble gas combined with a light emitter, a second element or compound which typically comprises sulfur, selenium, a compound containing sulfur or selenium, or any one of a number of metal halides. Exposing the contents of the bulb to microwave energy of high intensity causes the noble gas to become a plasma. The free electrons within the plasma excite the light emitter within the bulb. When the light emitter returns to a lower electron state, radiation is emitted. The spectrum of light emitted depends upon the characteristics of the light emitter within the bulb. Typically, the light emitter is chosen to cause emission of visible light.

Plasma lamps of the type described above frequently require high intensity microwaves to initially ignite the noble gas into plasma. However, over half of the energy used to generate and maintain the plasma is typically lost as heat, making heat dissipation a problem. Hot spots can form on the bulb causing spotting on the bulb and thereby reducing the efficiency of the lamp. Methods have been proposed to reduce the hot spots by rotating the lamp to better distribute the plasma within the lamp and by blowing constant streams of air at the lamp. These solutions, however, add structure to the lamp, thereby increasing size and cost. Therefore, a need exists for a plasma lamp that requires less energy to ignite and maintain the plasma, and includes a minimum amount of additional structure for efficient dissipation of heat.

SUMMARY OF THE INVENTION

This invention provides distinct advantages over the electrodeless plasma lamps in the background art, such as brighter and spectrally more stable light, greater energy efficiency, smaller overall lamp sizes, and longer useful life spans. Rather than using a waveguide with an air-filled resonant cavity, embodiments of the invention use a waveguide having a body consisting essentially of at least one dielectric material having a dielectric constant greater air approximately 2. Such dielectric materials include solid materials such as ceramics, and liquid materials such as silicone oil. A larger dielectric constant permits "dielectric waveguides" to be significantly smaller than waveguides of the background art, enabling their use in many applications where the smallest size achievable heretofore has made such use impossible or impractical.

In one aspect of the invention, a lamp includes a waveguide having a body including a ceramic dielectric material, and a side determined by a waveguide outer surface. The lamp further includes a microwave feed positioned within and in intimate contact with the body which couples energy into the body from a microwave source operating at a frequency within a range of about 0.5 to about 30 GHz. The source operating frequency and intensity and the body shape and dimensions are selected such that the body resonates in at least one resonant mode having at least one electric field maximum. The lamp further includes an enclosed first cavity depending from the waveguide outer surface into the body. Positioned within the cavity is a bulb proximate to an electric field maximum. The bulb contains a gas-fill which when receiving microwave energy from the resonating waveguide body forms a light-emitting plasma.

In another aspect of the invention, a method for producing light includes the steps of: (a) coupling microwave energy into a waveguide having a body including a ceramic dielectric material and a side determined by a waveguide outer surface with a cavity depending therefrom into the body, the body resonating in at least one resonant mode having at least one electric field maximum; (b) directing the resonant energy into an envelope determined by the cavity and a window, the envelope containing a gas-fill; and (c) creating a plasma by interacting the resonant plasma with the gas-fill, thereby causing light emission.

DETAILED DESCRIPTION OF THE PREFERRED EMBODIMENTS

Figure 1:
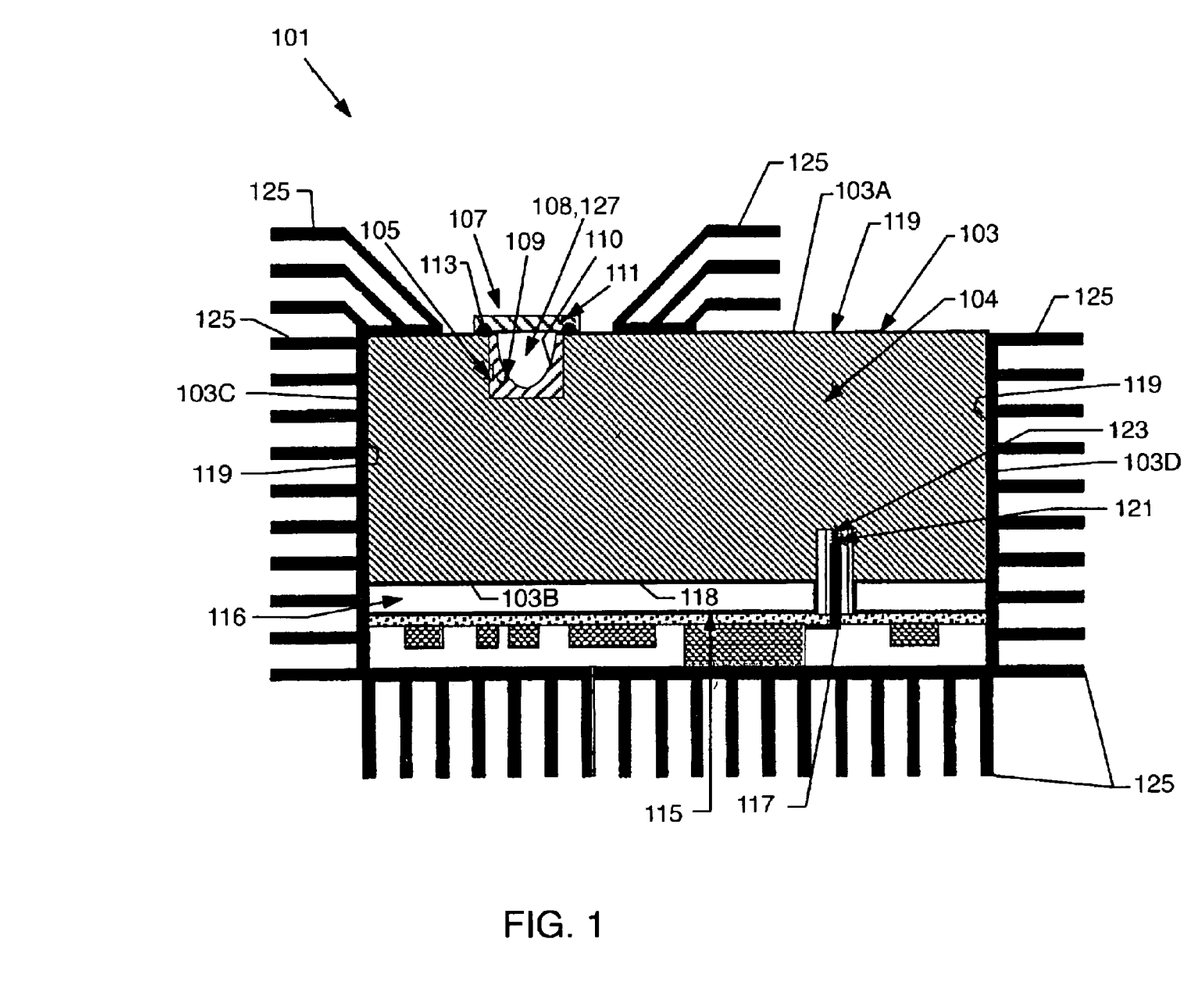
FIG. 1 illustrates a sectional view of a dielectric waveguide integrated plasma lamp (DWIPL) including a waveguide halting a body consisting essentially of a solid dielectric material, integrated with a bulb containing a light-emitting plasma.

Turning now to the drawings, FIG. 1 illustrates a preferred embodiment of a dielectric waveguide integrated plasma lamp (DWIPL) 101. DWIPL 101 includes a source 115 of microwave radiation, a waveguide 103 having a body 104 formed of a solid dielectric material, and a microwave feed 117 coupling the radiation source 115 to the waveguide 103. Waveguide 103 is determined by opposed sides 103A, 103B, and opposed sides 103C, 103D generally transverse to sides 103A, 103B. As used herein, the term "waveguide" generally refers to any device having a characteristic and purpose of at least partially confining electromagnetic energy. As used herein, the term "dielectric waveguide" refers to a waveguide having a body consisting essentially of at least one dielectric material having a dielectric constant greater than approximately 2. DWIPL 101 further includes a bulb 107, disposed proximate to side 103A and preferably generally opposed to feed 117, containing a gas-fill 108 including a noble gas and a light emitter, which when receiving microwave energy at a predetermined operating frequency and intensity forms a plasma and emits light. As used herein, the term "ignition" means initial breakdown of atoms or molecules of the initially neutral gas-fill into ions.

Source 115 provides microwave energy to waveguide 103 via feed 117. The waveguide contains and guides the energy to an enclosed cavity 105, depending from side 103A into body 104, in which is disposed bulb 107. This energy frees electrons from noble gas atoms, thereby creating a plasma. The free electrons excite the light emitter. De-excitation of the light emitter results in emission of light. As will become apparent, the DWIPL embodiments disclosed herein offer distinct advantages over the plasma lamps in the related art, such as an ability to produce brighter and spectrally more stable light, greater energy efficiency, smaller overall lamp sizes, and longer useful life spans.

The microwave source 115 in FIG. 1 is shown schematically as solid state electronics; however other devices commonly known in the art operating in the 0.5–30 GHz range may also be used, including but not limited to klystrons and magnetrons. The preferred operating frequency range for source 115 is from about 500 MHz to about 10 GHz.

Depending upon the heat sensitivity of source 115, the source may be thermally isolated from bulb 107, which during operation typically reaches temperatures between about 700° C. and about 1000° C. Thermal isolation of bulb 107 from source 115 provides a benefit of avoiding degradation of the source due to heating. Additional thermal isolation of the source may be accomplished by any one of a number of methods commonly known in the art, including but not limited to using an insulating material or vacuum gap occupying an optional space 116 between the source 115 and waveguide 103. If the space 116 is included, appropriate microwave feeds are used to couple the source 115 to the waveguide 103.

In FIG. 1, feed 117 that transports microwave energy from the source 115 to the waveguide 103 preferably includes a coaxial probe. However, any one of several different types of microwave feeds known in the art may be used, such as microstrip lines or fin line structures.

Due to mechanical and other considerations such as heat, vibration, aging and shock, when feeding microwave energy into the dielectric material, contact between the feed 117 and waveguide 103 preferably is maintained using a positive contact mechanism 121. The mechanism provides a constant pressure by the feed on the waveguide to minimize the possibility that microwave energy will be reflected back through the feed rather than entering the waveguide. In providing constant pressure, the contact mechanism compensates for small dimensional changes in the feed and waveguide that may occur due to thermal heating or mechanical shock. Contact mechanism 121 may be a spring loaded device, such as illustrated in FIG. 1, a bellows type device, or any other device commonly known in the art that can sustain a constant pressure for continuously and steadily transferring microwave energy.

When coupling feed 117 to waveguide 103, intimate contact preferably is made by depositing a metallic material 123 directly on the waveguide at its point of contact with the feed. This material eliminates gaps that may disturb the coupling, and preferably includes gold, silver or platinum, although other conductive materials may be used. The material may be deposited using any one of several methods commonly known in the art, such as depositing the material as a liquid and then firing it in an oven to provide a solid contact.

In FIG. 1, waveguide 103 is in the shape of a rectangular prism. However, the waveguide may have a cylindrical prism shape, a sphere-like shape, or any other shape, that can efficiently guide microwave energy from the feed 117 to the bulb 107, including a complex, irregular shape whose resonant frequencies preferably are determined using electromagnetic theory simulation tools. The actual dimensions of the waveguide will vary depending upon the microwave operating frequency and the dielectric constant of the waveguide body 104.

In one preferred embodiment, body 104 has a volume of approximately 12,500 mm$^3$ and a dielectric constant of approximately 9, and the operating frequency is approximately 2.4 GHz. Waveguide bodies of this scale are significantly smaller than the waveguides in the plasma lamps of the related art. Thus, waveguides according to the present invention represent a significant advance over the related art because their smaller size allows them to be used in manly applications where the smallest size achievable heretofore has precluded or made wholly impractical such use. By using materials with larger dielectric constants, even smaller sizes can be achieved. Besides the obvious advantages provided by smaller size, size reduction translates into higher power density and lower loss, thereby making lamp ignition easier.

Regardless of its shape and size, waveguide body 104 preferably includes a solid dielectric material having the following properties: (1) a dielectric constant greater than approximately 2; (2) a loss tangent less than approximately 0.01; (3) a thermal shock resistance quantified by a failure temperature greater than approximately 200° C.; (4) a DC breakdown threshold greater than approximately 200 kilovolts/inch; (5) a coefficient of thermal expansion less than approximately $10^{-5}/°$ C.; (6) a zero or slightly negative temperature coefficient of the dielectric constant; (7) stoichiometric stability over a temperature range of about –80° C. to about 1000° C.; and (8) a thermal conductivity of approximately 2 W/mK (watts per milliKelvin).

Certain ceramics, including alumina, zirconia, titanates and variations or combinations of these materials may satisfy many of the above preferences, and may be used because of there electrical and thermo-mechanical properties. Alternatively, the dielectric material may be a silicone oil. Preferably, body 104 has a substantial thermal mass which aids efficient distribution and dissipation of heat and provides thermal isolation between source 115 and bulb 107.

Figure 2A:
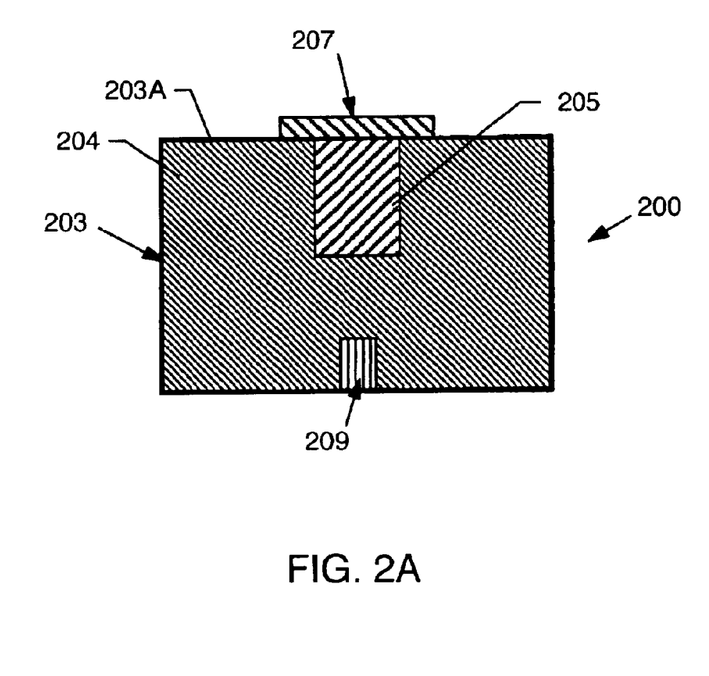
FIGS. 2A and 2B illustrate sectional views of alternative embodiments of a DWIPL.

Referring to FIG. 2A, a DWIPL 200 includes a waveguide 203 having a body 204 consisting essentially of a solid dielectric material, and a side 203A with an enclosed cavity 205 depending from side 203A into body 204 A bulb 207 is disposed within the cavity. DWIPL 200 further includes a microwave feed 209 generally opposed to cavity 205. Preferably, bulb 207 is in the same plane as feed 209, where the electric field of the microwave energy is at a maximum, Where more than one maximum of the electric field is present in waveguide 203, the cavity and bulb are positioned at one maximum and the feed at another maximum. By placing the feed and bulb at field maxima, the amount of energy transferred into the bulb is maximized.

Figure 2B:
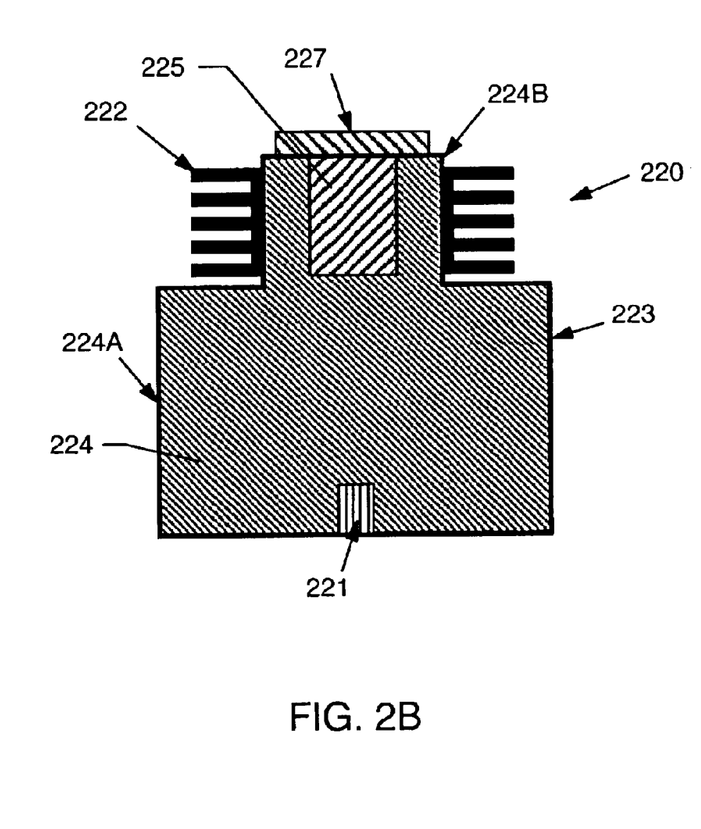

Referring to FIG. 2B, a DWIPL 220 includes a waveguide 223 having a body 224 with a main portion 224A consisting essentially of a solid dielectric material. Body 224 further includes a convexly-shaped portion 224B which protrudes outwardly from portion 224A to form an enclosed cavity 225. As in DWIPL 200, a bulb 227 disposed within cavity 225 is positioned generally opposed to a microwave feed 221. In contrast to DWIPL 200, bulb 227 may be positioned in a plane other than the plane of feed 221 where more than one maximum of the electric field is present in waveguide 223.

Returning to FIG. 1. sides 103A, 103B, 103C, 103D of waveguide 103, with the exception of those surfaces depending from side 1034A into body 104 which form cavity 105, are coated with a thin metallic coating 119 which reflects microwaves in the operating frequency range. The overall reflectivity of the coating determines the level of energy within the waveguide. The more energy that can be stored within the waveguide, the greater the efficiency of lamp 101. Preferably, coating 119 also suppresses evanescent radiation leakage and significantly attenuates any stray microwave field(s).

Microwave leakage from cavity 105 is significantly attenuated by choosing the cavity dimensions to be significantly smaller than the wavelength(s) of the microwaves used to operate lamp 101. For example, the length of the diagonal of a window scaling the cavity should be considerably less than half the microwave wavelength (in free space).

Still referring to FIG. 1, bulb 107 includes an outer wall 109 having an inner surface 110, an(d a window 111. Alternatively, the cavity wall acts as the outer wall of the bulb. The components of bulb 107 preferably include at least one dielectric material, such as a ceramic or sapphire. In one embodiment, the ceramic in the bulb is the same, as the material used in body 104. Dielectric materials are preferred for the bulb 107 because the bulb preferably is surrounded by the body 104, and the dielectric materials facilitate efficient coupling of microwave energy with the gas-fill 108 in the bulb.

In FIG. 1, outer wall 109 is coupled to window 111 using a seal 113, thereby determining a bulb envelope 127 which contains the gas-fill 108. The plasma-forming gas is preferably a noble gas. The light emitter is preferably a vapor formed of any one of a number of elements or compounds known in the art, such as sulfur, selenium, a compound containing sulfur or selenium, or a metal halide such as indium bromide (InBr).

To confine the gas-fill within the bulb, the seat 113 preferably is a hermetic seal. Outer wall 109 preferably includes alumina because of its white color, temperature stability, low porosity, and coefficient of thermal expansion. However, other materials that provide one or more of these properties may be used. Preferably, outer wall 109 is contoured to maximize the amount of light reflected out of cavity 105 through window 111. For instance, the outer wall may have a parabolic contour. However, other outer wall contours or configurations that facilitate directing light out through the window may be used.

Window 111 preferably includes sapphire for high light transmissivity and because its coefficient of thermal expansion matches well with that of alumina. Alternatively, other materials having a similar light transmittance and thermal expansion properties may be used. Alternatively, window 111 includes a lens to collect the emitted light.

As referenced above, during operation bulb 107 may reach temperatures of up to about 1000° C. Under such conditions, body 104 acts as a heat sink for the bulb By reducing the heat load and heat-induced stress on the various elements of DWIPL 101, the lamp's useful life span can be increased beyond the life span of electrodeless lamps in the related art. As shown in FIG. 1, effective heat dissipation may be obtained by attaching a plurality of heat-sinking fins 125 to sides 103A, 103C and 103D. In DWIPL 220 (see FIG. 2B), cavity 225 extends away from the main portion 224A of body 224, allowing heat to be removed efficiently by placing a plurality of fins 222 proximate to bulb 227.

Alternatively, waveguide body 104 includes a dielectric, such as a titanate, which generally is unstable at high temperature. In such embodiments, the waveguide 103 is preferably shielded from the heat generated in bulb 107 by interposing a thermal barrier between the body and bulb. Alternatively, the outer wall 109 includes a material with low thermal conductivity, such as an NZP (NaZr$_2$(PO$_4$)$_3$) ceramic, which acts as a thermal barrier.

Figure 3A:
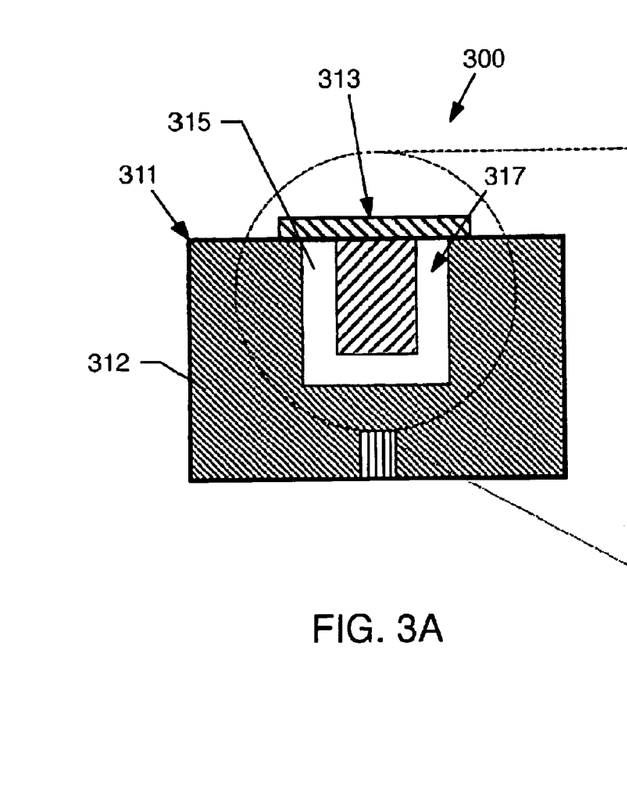
FIGS. 3A and 3B illustrate a sectional view of an alternative embodiment of a DWIPL wherein the bulb is thermally isolated from the dielectric waveguide.

FIGS. 3A and 3B illustrate a DWIPL 300 wherein a vacuum gap acts as a thermal barrier. As shown in FIG. 3A, DWIPL 300 includes a bulb 313 disposed within a cavity 315 which is separated from body 312 of a waveguide 311 by a vacuum gap 317 whose thickness is dependent upon microwave propagation characteristics and the material strengths of waveguide body 312 and bulb 313. The vacuum minimizes heat transfer between the bulb and waveguide.

Figure 3B:
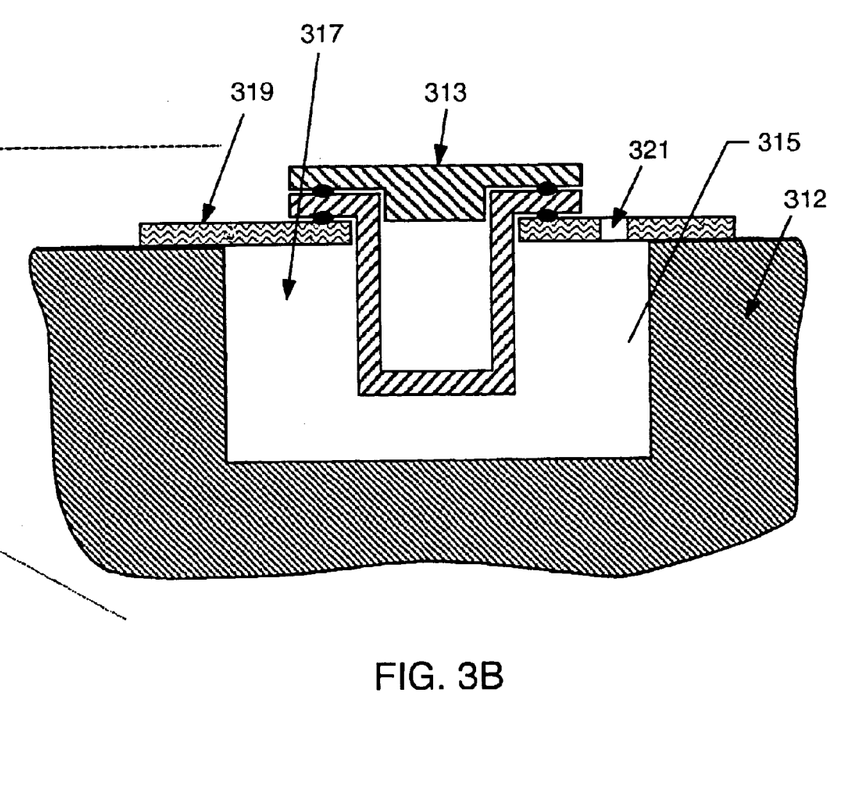

FIG. 3B illustrates a magnified view of bulb 313, cavity 315 and vacuum gap 317. The boundaries of gap 317 are formed by the waveguide 311, a bulb support 319, and bulb 313. Support 319 is sealed to the waveguide and extends over the edges of cavity 315. The support includes a material having high thermal conductivity, such as alumina, to help dissipate heat from the bulb.

Embedded in support 319 is an access seal 321 which maintains a vacuum within gap 317 when bulb 313 is in place. Preferably, the bulb is supported by and hermetically sealed to support 319. Once a vacuum is established in gap 317, heat transfer between the bulb and waveguide is substantially reduced.

Preferably, DWIPLs 101, 200, 220 and 300 operate at a microwave frequency in the range of about 0.5 to 10 GHz. The operating frequency is preselected so as to excite one or more resonant modes supported by the size and shape of the waveguide, thereby establishing one or more electric field maxima within the waveguide. When used as a resonant cavity, at least one dimension of the waveguide is preferably an integer number of half-wavelengths.

Figures 4A, 4B, 4C:
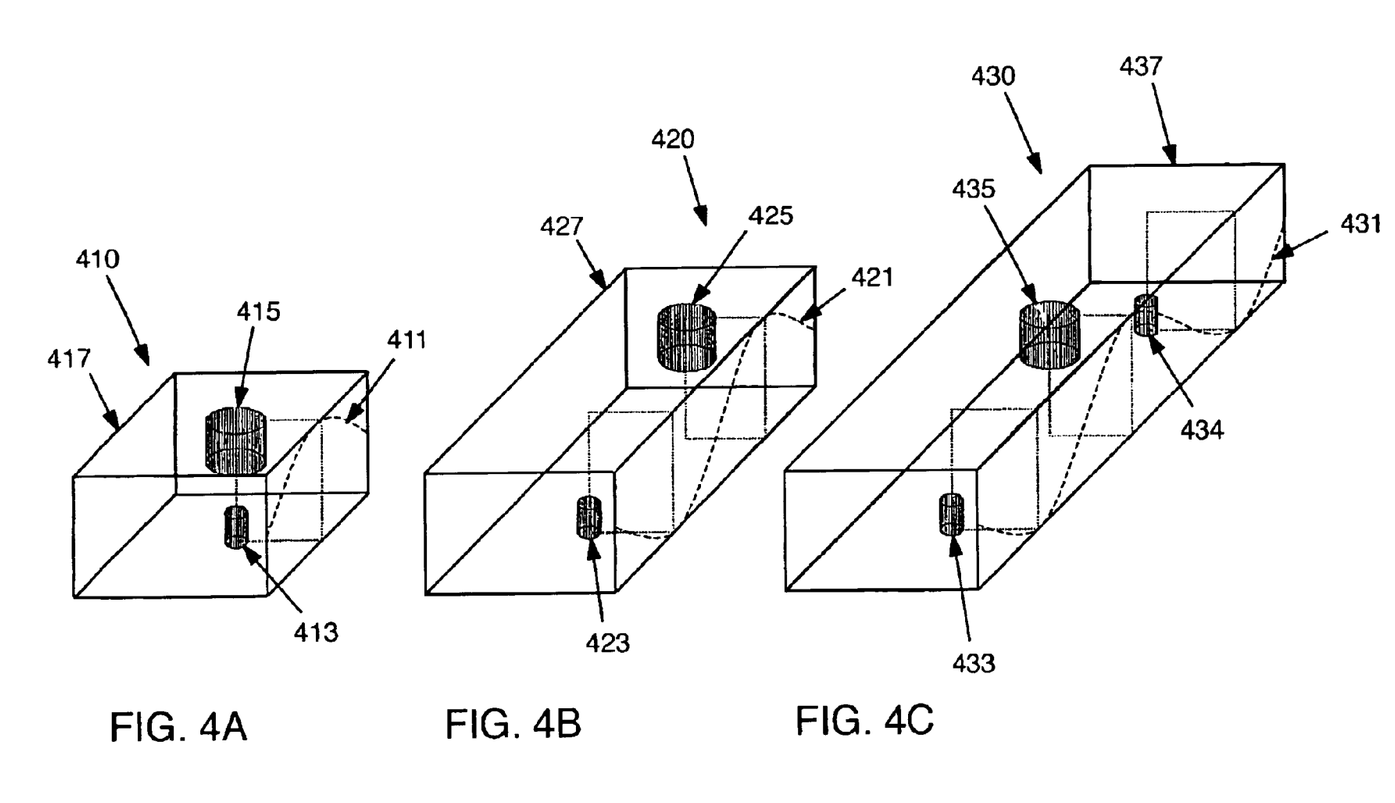
FIGS. 4A–D illustrate different resonant modes within a rectangular prism-shaped dielectric waveguide.

FIGS. 4A, 4B and 4C schematically illustrate three DWIPLs 410, 420, 430, each operating in a different resonant mode. It is to be understood that each of these figures represents DWIPL 101, DWIPL 200, DWIPL 220 or DWIPL 300 operating in the respective resonant mode depicted. Referring to FIG. 4A, DWIPL 410 operates in a first resonant mode 411 where the length of one axis of a rectangular prism-shaped waveguide 417 is one-half the wavelength of the microwave energy used. In FIG. 4B, DWIPL 420 operates in a second resonant mode 421 where the length of one axis of a rectangular prism-shaped waveguide 427 equals the microwave wavelength. In FIG. 4C, DWIPL 430 operates in a third resonant mode 431 where the length of one axis of a rectangular prism-shaped waveguide 437 is three-halves the microwave wavelength. DWIPL 430 includes first and second microwave feeds 433, 434 which supply energy to the waveguide. The feeds may be coupled to a single microwave source or individually to separate sources. DWIPLs 410, 420, 430 further include, respectively, a bulb cavity 415, 425, 435. As used herein, the term "bulb cavity" refers to the combination of an enclosed cavity and a bulb disposed within the cavity containing a gas-fill including a noble gas and a light emitter, which when receiving microwave energy at a predetermined operating frequency and intensity forms a plasma and emits light.

In DWIPLs 410, 420, 430, bulb cavities 415, 425, 435, respectively, and feeds 413, 423, and (433, 434), respectively, are preferably positioned with respect to waveguides 417, 427, 437, respectively, at locations where the electric fields are at an operational maximum. However, the bulb cavity and feed(s) do not necessarily have to lie in the same plane.

Figure 4D:
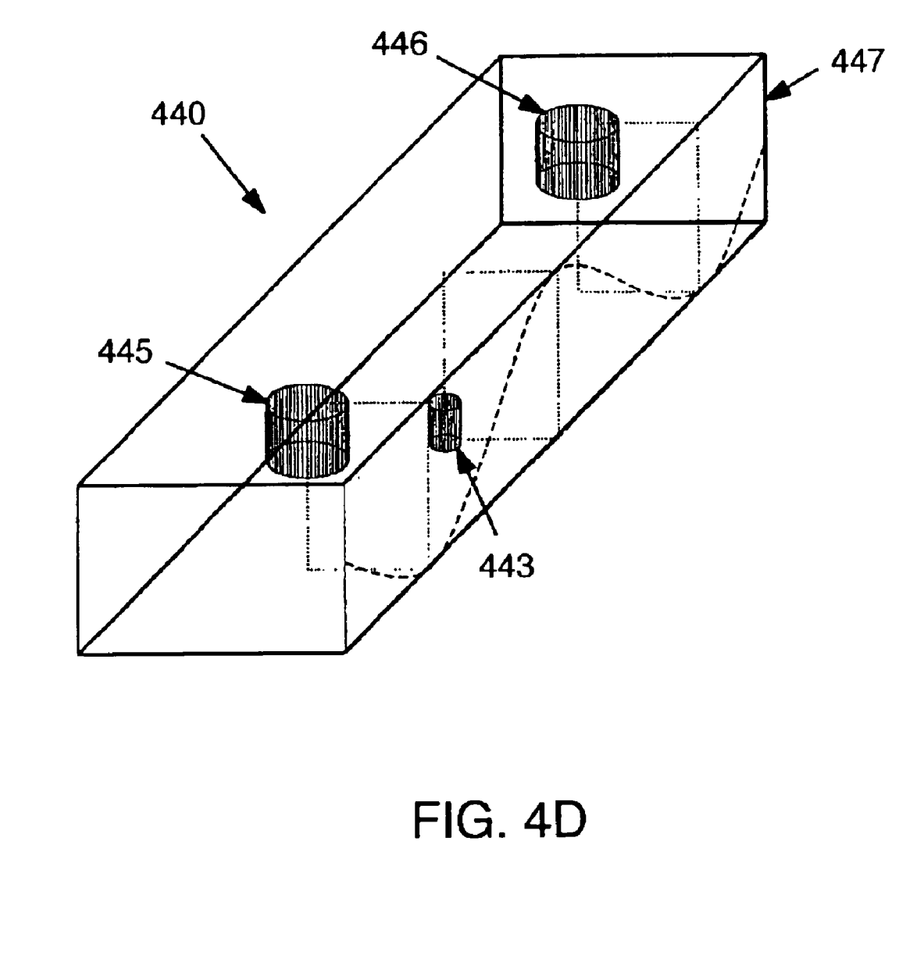

FIG. 4D schematically illustrates a DWIPL 440 wherein a single microwave feed 443 provides energy to a waveguide 447 having first and second bulb cavities 445, 446, each positioned with respect to the waveguide at locations where the electric field is at a maximum. It is to be understood that FIG. 4D represents DWIPL 101, DWIPL 200, DWIPL 220 or DWIPL 300 operating in the resonant mode depicted, but with the DWIPL modified to include two bulb cavities.

Figure 5A:
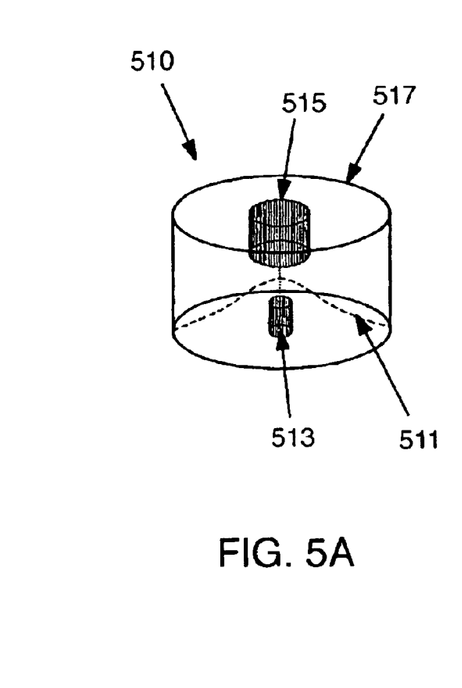
FIGS. 5A–C illustrate different resonant modes within a cylindrical prism-shape dielectric waveguide.
Figure 5B:
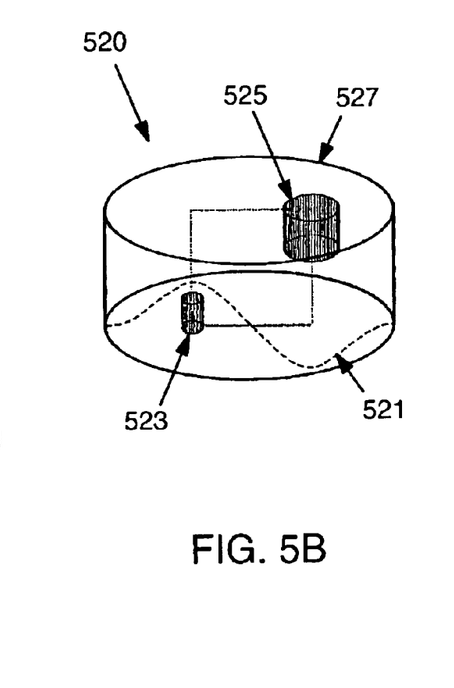
Figure 5C:
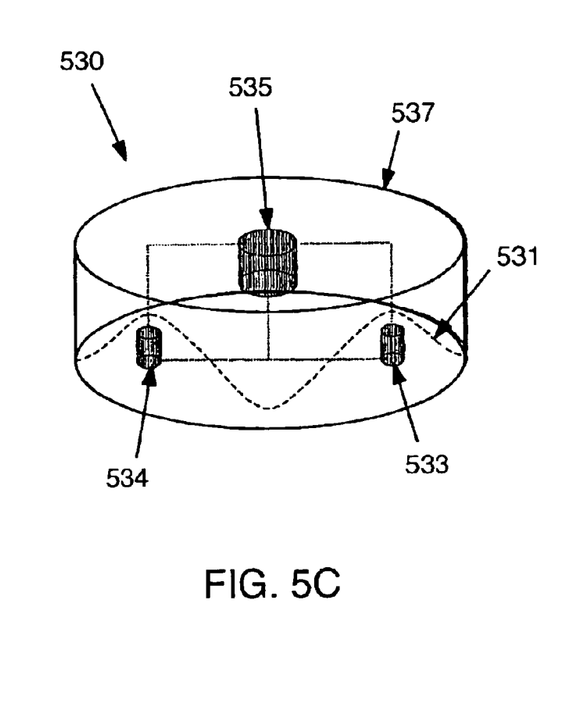

FIGS. 5A, 5B and 5C schematically illustrate three DWIPLs 510, 520, 530 each having a cylindrical prism-shaped waveguide 517, 527, 537, respectively, and operating in a different resonant mode. It is to be understood that each of these figures represents DWIPL 101, DWIPL 200, DWIPL 220 or DWIPL 300 operating in the respective resonant mode depicted, but with the DWIPL modified to have a cylindrical waveguide. In each DWIPL, the height of the cylinder is less than its diameter, and the diameter is close to an integer multiple of the lowest order half-wavelength that can resonate within the waveguide. Placing these dimensional constraints on the cylinder results in the lowest resonant mode being independent of cylinder height so that the cylinder diameter dictates the fundamental mode of the energy within the waveguide. Cylinder height can thus be optimized for other requirements such as size and heat dissipation. In FIG. 5A, a microwave feed 513 is positioned directly opposed to bulb cavity 515 where the zeroeth order Bessel mode 511 is a maximum. In FIG. 5B, cylindrical waveguide 527 has a diameter close to one wavelength long, so that the first order Bessel mode 521 is excited. Feed 523 is positioned at the field maximum and is diagonally opposed to bulb cavity 525. In FIG. 5C, cylindrical waveguide 537 has a diameter close to three half-wavelengths long so that there are two electric field maxima at which are positioned feeds 533, 534 which provide energy to the waveguide. Bulb cavity 535 is disposed symmetrically between the two feeds. Generally, in a DWIPL having a cylinder-shaped waveguide the cavity and feed(s) are preferably positioned with respect to the waveguide at locations where the electric field is a maximum.

A dielectric waveguide provides several distinct advantages. Firstly, as discussed above, the waveguide body can be used to dissipate heat generated in the bulb. Secondly, higher power densities can be achieved within a dielectric waveguide than are possible in plasma lamps with air cavities such as those in present use. Depending on the dielectric constant of the material used for the waveguide body, the energy density of a dielectric waveguide will be somewhat or substantially greater than the energy density in an air cavity waveguide of similar dimensions in a plasma lamp of the related art.

Referring again to FIG. 1, high resonant energy within waveguide 103 of DWIPL 101, corresponding to a high Q-value in the waveguide (where Q is the ratio of the operating frequency to the frequency width of the resonance), results in high evanescent leakage of microwave energy into cavity 105. High leakage into the cavity leads to quasi-static breakdown of the noble gas within envelope 127, thereby generating the first free electrons. The oscillating energy of the free electrons scales as $I\lambda^2$, where I is the circulating intensity of the microwave energy and $\lambda$ is the wavelength. Thus, the higher the microwave energy, the greater is the oscillating energy of the free electrons. By making the oscillating energy greater than the ionization potential of the gas, electron-neutral collisions result in efficient build-up of plasma density.

Once a plasma is formed in DWIPL 101 and the incoming power is absorbed, the waveguide's Q-value drops due to the conductivity and absorption properties of the plasma. The drop in Q-value is generally due to a change in the impedance of the waveguide. After plasma formation, the presence of the plasma in the cavity makes the cavity absorptive to the resonant energy, thus changing the waveguide impedance. This change in impedance is effectively a reduction in the overall reflectivity of the waveguide. By matching the reflectivity of the feed to be close to the reduced reflectivity of the waveguide, a sufficiently high Q-value may be obtained even after plasma formation so that the plasma is sustained. Consequently, a relatively low net reflection back into the energy source is realized.

Much of the energy absorbed by the plasma eventually appears as heat such that the bulb temperature may approach 1000° C. When the waveguide is also used as a heat sink, as previously described, the dimensions of the waveguide may change due to thermal expansion. If the waveguide expands, the microwave frequency that will resonate within the waveguide changes and resonance is lost. In order for resonance to be maintained, the waveguide must have at least one dimension equal to an integer multiple of the half-wavelength of the microwaves being generated by source 115.

A DWIPL embodiment that compensates for such dimensional changes includes a waveguide having a body consisting essentially of a solid dielectric material with a temperature coefficient for its refractive index that is approximately equal and opposite in sign to its coefficient of thermal expansion Dimensional changes due to thermal heating are offset by a change in refractive index, thus decreasing the possibility that resonance will be interrupted. Such materials include titanates. Alternatively, dimensional changes due to heating may be compensated for by tapering the walls of the waveguide.

Figure 6:
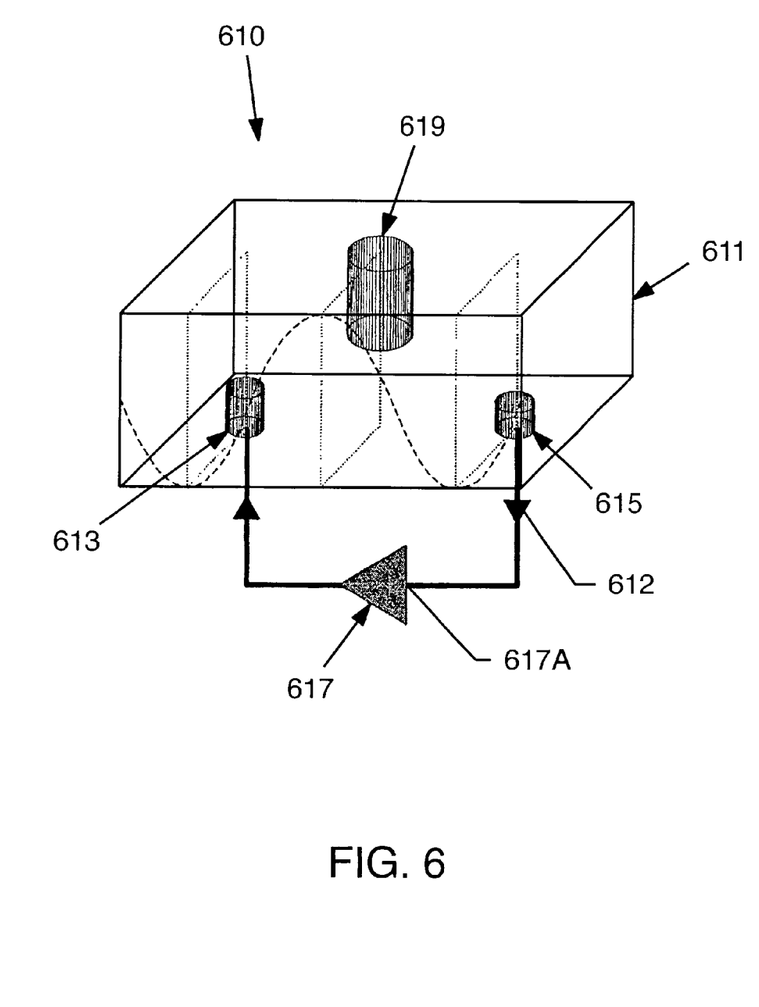
FIG. 6 illustrates a DWIPL embodiment wherein a feedback mechanism provides information to a microwave source from a feed probing the waveguide field, thereby dynamically maintaining a resonant mode within the waveguide.

FIG. 6 schematically shows a DWIPL 610 operated in a dielectric resonant oscillator mode wherein first and second microwave feeds 613, 615 are coupled between a dielectric waveguide 611, which may be of any shape previously discussed, and a microwave energy source 617. Source 617 is preferably broadband with a high gain and high output power, and is capable of driving the plasma to emission. DWIPL 610 further includes a bulb cavity 619.

Feed 613 generally operates as described for the other embodiments disclosed herein. Feed 615 probes the waveguide 611 to instantaneously sample the field (including amplitude and phase information contained therein), and provides the sampled field information via a feedback means 612 to an input 617A of energy source 617 or to a separate amplifier. In probing the waveguide, feed 615 also preferably acts to filter out stray frequencies, leaving only the resonant frequency within the waveguide. Preferably, feeds 613, 615 and bulb cavity 619 are each positioned with respect to waveguide 611 at locations where the electric field is at a maximum. Using the sampling information provided by feed 615, the energy source 617 amplifies the resonant energy within the waveguide. The source thereby adjusts its output frequency to dynamically maintain one or more resonant modes in the waveguide. The complete configuration thus forms a resonant oscillator. In this manner, automatic compensation may be realized for frequency shifts due to plasma formation and changes in waveguide dimensions and dielectric constant due to thermal effects, enabling continuous operation of the lamp, The dielectric resonant oscillator mode also enables DWIPL 610 to have an immediate re-strike (i.e., re-ignition) capability after being turned off. As previously discussed, the resonant frequency of the waveguide may change due to thermal expansion and/or changes in the dielectric constant caused by heat generated during operation. When DWIPL 610 is shut down, heat is slowly dissipated resulting in instantaneous changes in the resonant frequency of the waveguide.

However, as indicated above, in the resonant oscillator mode the energy source 617 automatically compensates for changes in the resonant frequency of the waveguide 611. Therefore, regardless of the startup characteristics of the waveguide, and providing that energy source 617 has the requisite bandwidth, the energy source will automatically compensate to achieve resonance within the waveguide. Thus, the energy source immediately provides power to the DWIPL at the optimum plasma-forming frequency.

While several embodiments for carrying out the invention have been shown and described, it will be apparent to those skilled in the art that additional modifications are possible without departing from the inventive concepts detailed herein. It is to be understood, therefore, there is no intention to limit the invention to the particular embodiments disclosed. On the contrary, it is intended that the invention cover all modifications, equivalences and alternative constructions falling within the spirit and scope of the invention as expressed in the appended claims.

What is claimed is:

1. A lamp comprising:
   (a) a waveguide having a body comprising a ceramic dielectric material of a preselected shape and preselected dimensions, the body having a first side determined by a fist waveguide outer surface;
   (b) a first microwave feed positioned within and in intimate contact with the waveguide body, adapted to couple microwave energy into the body from a microwave source having an output and an input and operating within a frequency range from about 0.5 to about 30 GHz at a preselected frequency and intensity, the feed connected to the source output, said frequency and intensity and said body shape and dimensions selected such that the body resonates in at least one resonant mode having at least one electric field maximum;
   (c) an enclosed first cavity depending from said first surface into the waveguide body; and
   (d) a first bulb positioned in the cavity at a location corresponding to an electric field maximum during operation, the bulb containing a gas-fill which when receiving microwave energy from the resonating waveguide body forms a light-emitting plasma.

2. The lamp of claim 1, wherein the waveguide has an outer coating of a metallic material.

3. The lamp of claim 2, wherein a plurality of heat-sinking fins are attached to said metallic outer coating.

4. The lamp of claim 1, wherein the bulb comprises an outer wall having an inner surface, and a window covering the cavity.

5. The lamp of claim 4, wherein the window is substantially transparent to the light emitted by the plasma.

6. The lamp of claim 4, wherein the window comprises sapphire.

7. The lamp of claim 4, wherein the inner surface of the bulb outer wall is at least partially reflective of light emitted by the plasma.

8. The lamp of claim 4, wherein the inner surface of the bulb outer wall is contoured to reflect light towards the window.

9. The lamp of claim 4, wherein the bulb outer wall comprises a dielectric material.

10. The lamp of claim 9, wherein the dielectric material is a ceramic.

11. The lamp of claim 4, wherein the bulb outer wall and window have approximately equal coefficients of thermal expansion.

12. The lamp of claim 4, wherein the bulb outer wall thermally isolates the bulb from the waveguide body.

13. The lamp of claim 1, wherein said ceramic dielectric material has a dielectric constant greater than about 2.

14. The lamp of claim 1, wherein said operating frequency is in a range from about 0.5 to about 10 GHz.

15. The lamp of claim 1, wherein said shape of the waveguide body is a rectangular prism.

16. The lamp of claim 1, wherein the first microwave feed is in intimate contact with the waveguide body via a positive contact mechanism maintaining a constant pressure by the feed on the body.

17. The lamp of claim 1, wherein the microwave source is thermally isolated from the waveguide body and the bulb.

18. The lamp of claim 1, wherein the gas-fill comprises a noble gas and a metal halide.

19. The lamp of claim 1 wherein the microwave source is intrinsic to the lamp.

20. The lamp of claim 1, wherein the first microwave feed is inserted into the waveguide body through a second waveguide outer surface generally opposed to said first waveguide outer surface.

21. The lamp of claim 1, wherein said shape of the waveguide body is a cylindrical prism.

22. The lamp of claim 1, wherein said shape of the waveguide body is a sphere.

23. The lamp of claim 1, further comprising a space between the microwave source and waveguide body wherein a thermally insulating material is disposed in said.

24. The lamp of claim 23, wherein the space is evacuated.

25. The lamp of claim 1, wherein the first microwave feed is positioned proximate to an electric field maximum.

26. The lamp of claim 25, firmer comprising:
(a) an enclosed second cavity depending from said first surface into the waveguide body; and
(b) a second bulb positioned in the second cavity at a location corresponding to an electric field maximum during operation, the bulb containing a gas-fill which when receiving microwave energy from the resonating waveguide body forms a light-emitting plasma.

27. The lamp of claim 1, wherein the waveguide body resonates in a mode having at least two electric field maxima, and the first microwave feed and bulb are positioned proximate to different electric field maxima.

28. The lamp of claim 1, further comprising a second microwave feed positioned within the waveguide body.

29. The lamp of claim 28, wherein the waveguide body resonates in a mode having at least three electric field maxima, and the first microwave feed, the second microwave feed, and the bulb are each positioned proximate to different maxima.

30. The lamp of claim 28, wherein:
(a) the first microwave feed, the second microwave feed, and the bulb are each positioned proximate to an electric field maximum;
(b) the second microwave feed is connected to the microwave source input and probes the waveguide body to instantaneously sample the amplitude and phase of the electric field therein;
(c) the second feed feeds back the sampled amplitude and phase information to the source input; and
(d) the source amplifies the resonant energy within the waveguide body and dynamically adjusts the operating frequency to maintain at least one resonant mode in the body, thereby operating the lamp in a dielectric resonant oscillator mode.

31. The lamp of claim 28, further comprising:
(a) an enclosed second cavity depending from said first surface into the waveguide body; and
(b) a second bulb positioned in the second cavity at a location corresponding to an electric field maximum during operation, the bulb containing a gas-fill which when receiving microwave energy from the resonating waveguide body forms a light-emitting plasma.

32. A method for producing light comprising the steps of:
(a) coupling microwave energy characterized by a frequency and intensity into a waveguide having a body comprising a ceramic dielectric material of a preselected shape and preselected dimensions, the body having a side determined by an outer waveguide surface and a cavity depending from said surface into the body, said frequency and intensity and said body shape and dimensions selected such that the body resonates in at least one resonant mode having at least one electric field maximum;
(b) directing resonant microwave energy into an envelope determined by the cavity and a window, the envelope containing a gas-fill; and
(c) creating a plasma by interacting the resonant energy with the gas-fill, thereby causing emission of light.

33. The method of claim 32 further comprising the step of directing the light emitted through the window.

34. The method of claim 32, further comprising the step of dissipating heat generated by the plasma through said waveguide outer surface.

35. The method of claim 32, further comprising the steps of:
(d) sampling the amplitude and phase of the electric field within tho waveguide body; and
(e) adjusting the operating frequency of the microwave source until the sampled electric field is maximized.

* * * * *

UNITED STATES PATENT AND TRADEMARK OFFICE
CERTIFICATE OF CORRECTION

PATENT NO. : 6,737,809 B2
DATED : May 18, 2004
INVENTOR(S) : Frederick M. Espiau et al.

It is certified that error appears in the above-identified patent and that said Letters Patent is hereby corrected as shown below:

Column 1,
Line 4, change "priority-to" to -- priority to --.

Column 2,
Line 1, change "microwave&" to -- microwaves --.

Column 3,
Line 21, change "halting" to -- having --.

Column 4,
Line 2, change "De-excilation" to -- De-excitation --.
Line 62, change "shape," to -- shape --.

Column 5,
Line 10, change "manly" to -- many --.
Line 34, change "there" to -- their --.
Line 42, change "204 A" to -- 204. A --.
Line 64, change "FIG. 1." to -- FIG. 1, --.
Line 66, change "1034A" to -- 103A --.

Column 6,
Line 12, change "scaling" to -- sealing --.
Line 16, change "an(d" to -- and --.
Line 20, change "same," to -- same --.
Line 54, change "bulb By" to -- bulb. By --.

Column 7,
Line 60, change "413, 423" to -- (413, 423) --.

Column 9,
Line 27, change "expansion Dimensional" to -- expansion. Dimensional --.

Column 10,
Line 29, change "fist" to -- first --.

UNITED STATES PATENT AND TRADEMARK OFFICE
CERTIFICATE OF CORRECTION

PATENT NO. : 6,737,809 B2
DATED : May 18, 2004
INVENTOR(S) : Frederick M. Espiau et al.

It is certified that error appears in the above-identified patent and that said Letters Patent is hereby corrected as shown below:

Column 11,
Line 32, change "said." to -- said space. --.
Line 36, change "firmer" to -- further --.

Column 12,
Line 50, change "tho" to -- the --.

Signed and Sealed this

Eighth Day of February, 2005

JON W. DUDAS
*Director of the United States Patent and Trademark Office*